(12) United States Patent
Luo

(10) Patent No.: US 12,726,252 B2
(45) Date of Patent: Sep. 1, 2026

(54) BEAM DETERMINATION METHOD AND APPARATUS

(71) Applicant: Beijing Xiaomi Mobile Software Co., Ltd., Beijing (CN)

(72) Inventor: Xingyi Luo, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 289 days.

(21) Appl. No.: 18/705,824

(22) PCT Filed: Nov. 5, 2021

(86) PCT No.: PCT/CN2021/129109

§ 371 (c)(1), (2) Date: Apr. 29, 2024

(87) PCT Pub. No.: WO2023/077463

PCT Pub. Date: May 11, 2023

(65) Prior Publication Data

US 2026/0135601 A1 May 14, 2026

(51) Int. Cl.
*H04W 52/42* (2009.01)
*H04B 7/06* (2006.01)
*H04L 5/00* (2006.01)

(52) U.S. Cl.
CPC ....... *H04B 7/06952* (2023.05); *H04L 5/0044* (2013.01)

(58) Field of Classification Search
CPC .. H04B 7/06952; H04L 5/0044; H04W 52/08; H04W 52/42; H04W 52/146; H04W 52/346; H04W 52/367
See application file for complete search history.

(56) References Cited

U.S. PATENT DOCUMENTS

| | | | | |
|---|---|---|---|---|
| 2021/0235284 | A1 | 7/2021 | Venugopal et al. | |
| 2022/0046635 | A1* | 2/2022 | Liou .................... | H04B 7/0691 |
| 2023/0087510 | A1* | 3/2023 | Papasakellariou .... | H04L 1/1664 370/329 |
| 2023/0141660 | A1* | 5/2023 | Matsumura ........... | H04W 16/28 370/329 |

(Continued)

FOREIGN PATENT DOCUMENTS

| | | | |
|---|---|---|---|
| WO | WO 2020/146377 | A1 | 7/2020 |
| WO | WO 2021/007854 | A1 | 1/2021 |
| WO | 2021163408 | A1 | 8/2021 |

OTHER PUBLICATIONS

Extended European Search Report for European Application No. 21962976.3, dated Aug. 4, 2025, 14 pages.

(Continued)

*Primary Examiner* — Syed Ali

(74) *Attorney, Agent, or Firm* — Finnegan, Henderson, Farabow, Garrett & Dunner, L.L.P.

(57) ABSTRACT

A method for beam determination is performed by a terminal, and includes: determining transmission beams corresponding to a plurality of physical downlink shared channels (PDSCHs) or physical uplink shared channels (PUSCHs), wherein the plurality of PDSCHs or PUSCHs are scheduled through a piece of downlink control information (DCI) and configured to transmit different transmission blocks (TBs).

18 Claims, 4 Drawing Sheets

Communication system

101

102

Network device

Terminal device

(56) References Cited

U.S. PATENT DOCUMENTS

2023/0164782 A1* 5/2023 Kim ...................... H04W 72/23 370/329
2023/0189254 A1* 6/2023 Go .......................... H04B 7/06 370/329
2023/0199763 A1* 6/2023 Matsumura ........... H04L 5/0044 370/329
2024/0414734 A1* 12/2024 Matsumura ........... H04L 5/0053

OTHER PUBLICATIONS

Ericsson, "Beam management for new SCSs", 3GPP TSG-RAN WG1 Meeting #116-bis-e, Tdoc R1-2109437, e-Meeting, Oct. 11-19, 2021, 11 pages.
Sony, "Beam management enhancement for NR from 52.6GHz to 71GHz", 3GPP TSG RAN WG1#104bis, R1-2103297, E-meeting, Apr. 12-20, 2021, 6 pages.
Vivo, "Enhancements on Multi-TRP for PDCCH, PUCCH and PUSCH," 3GPP TSG RAN WG1 #104-e, R1-2100422, e-Meeting , Jan. 25-Feb. 5, 2021, 29 pages.
Xiaomi, "Enhancements on HST-SFN operation for multi-TRP PDCCH transmission," 3GPP TSG RAN WG1 #105-e, R1-2105543, e-Meeting, May 10-27, 2021, 5 pages.
International Search Report of International Application No. PCT/CN2021/129109, dated Jul. 25, 2022, 4 pages.

* cited by examiner

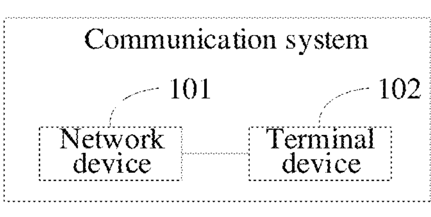
FIG. 1
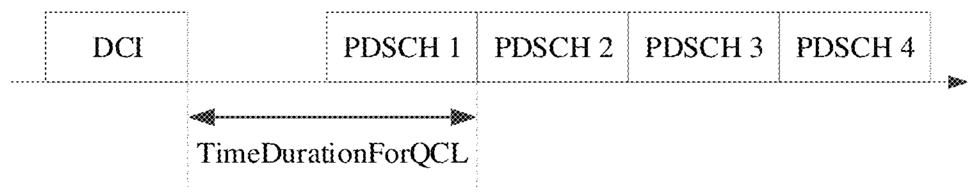
FIG. 2
FIG. 3
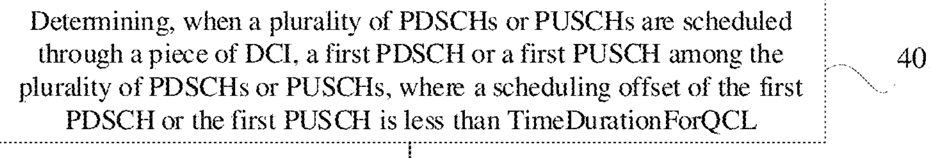
FIG. 4
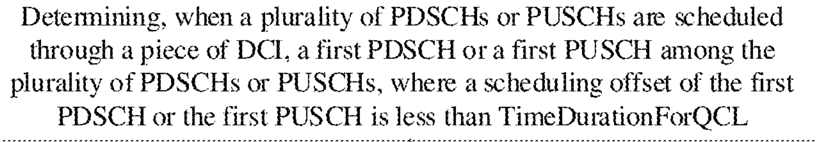
FIG. 5

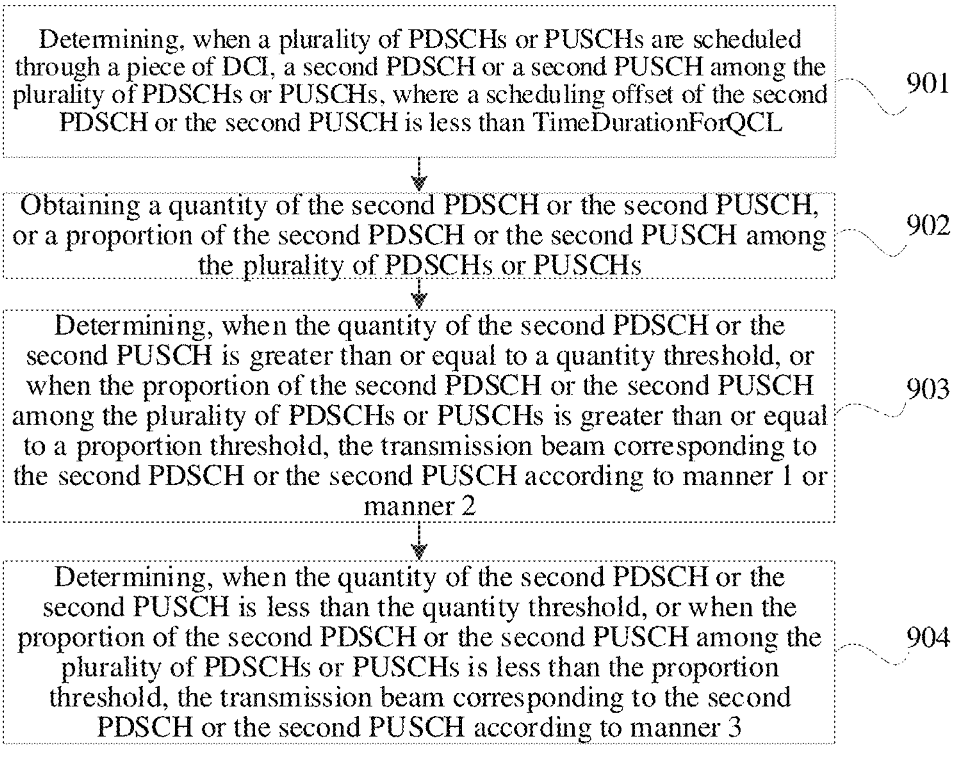
FIG. 9
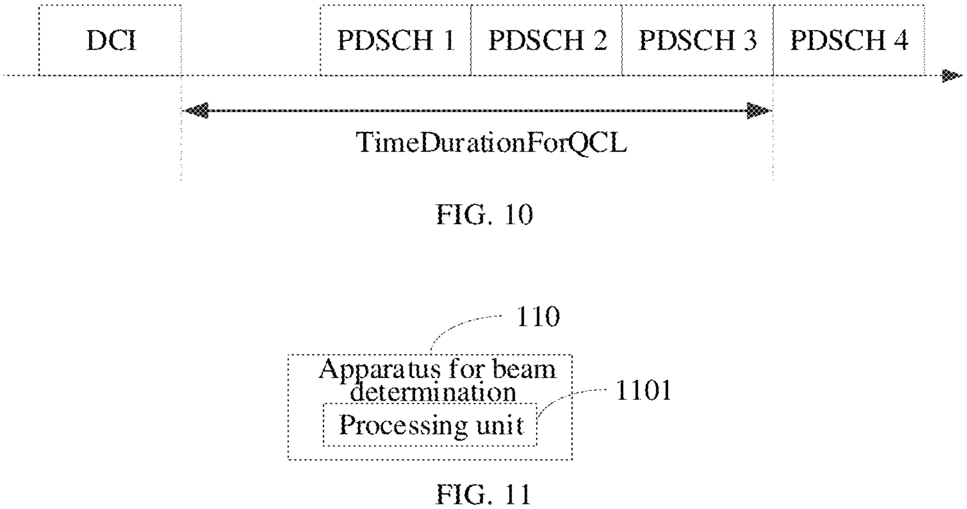
FIG. 10
FIG. 11

Memory
1303
Interface
1302
Bus
Processor
1301

BEAM DETERMINATION METHOD AND APPARATUS

CROSS REFERENCE TO RELATED APPLICATIONS

The present application is a U.S. National Stage of International Application No. PCT/CN2021/129109, filed on Nov. 5, 2021, the entire contents of which are incorporated herein by reference.

TECHNICAL FIELD

The present disclosure relates to the field of communication technology, and in particular, to a method and apparatus for beam determination.

BACKGROUND

At 52.6-71 GHz, it is supported that a plurality of physical downlink shared channels (PDSCHs)/physical uplink shared channels (PUSCHs) are scheduled through a piece of downlink control information (DCI), so as to reduce the overhead of blind detection on a physical downlink control channel (PDCCH).

SUMMARY

According to embodiments of a first aspect of the present disclosure, there is provided a method for beam determination; the method is performed by a terminal, and the method includes: determining, when a plurality of physical downlink shared channels (PDSCHs) or physical uplink shared channels (PUSCHs) are scheduled through a piece of downlink control information (DCI), transmission beams corresponding to the plurality of PDSCHs or PUSCHs, where the plurality of PDSCHs or PUSCHs are used to transmit different transmission blocks (TBs).

According to embodiments of a second aspect of the present disclosure, there is provided a terminal, where the terminal includes a processor and a memory; the memory stores a computer program; and when the computer program is executed by the processor, the method according to the first aspect is performed.

According to embodiments of a third aspect of the present disclosure, there is provided another terminal, where the terminal includes a processor and an interface circuit; the interface circuit is configured to receive a code instruction and transmit the code instruction to the processor; and the processor is configured to run the code instruction to enable the apparatus to perform the method according to the first aspect.

BRIEF DESCRIPTION OF THE DRAWINGS

The accompanying drawings of the present disclosure are briefly described below.

FIG. 1 is a schematic architectural diagram of a communication system according to some embodiments of the present disclosure;

FIG. 2 is a schematic diagram in which a scheduling offset of a PDSCH is less than TimeDurationForQCL;

FIG. 3 is a schematic flowchart of a method for beam determination according to some embodiments of the present disclosure;

FIG. 4 is a schematic flowchart of another method for beam determination according to some embodiments of the present disclosure;

FIG. 5 is a schematic flowchart of another method for beam determination according to some embodiments of the present disclosure;

FIG. 9 is a schematic flowchart of another method for beam determination according to some embodiments of the present disclosure;

FIG. 10 is another schematic diagram in which a scheduling offset of a PDSCH is less than TimeDurationForQCL according to some embodiments of the present disclosure;

FIG. 11 is a schematic structural diagram of an apparatus for beam determination according to some embodiments of the present disclosure;

DETAILED DESCRIPTION

Figures 6, 7, 8:
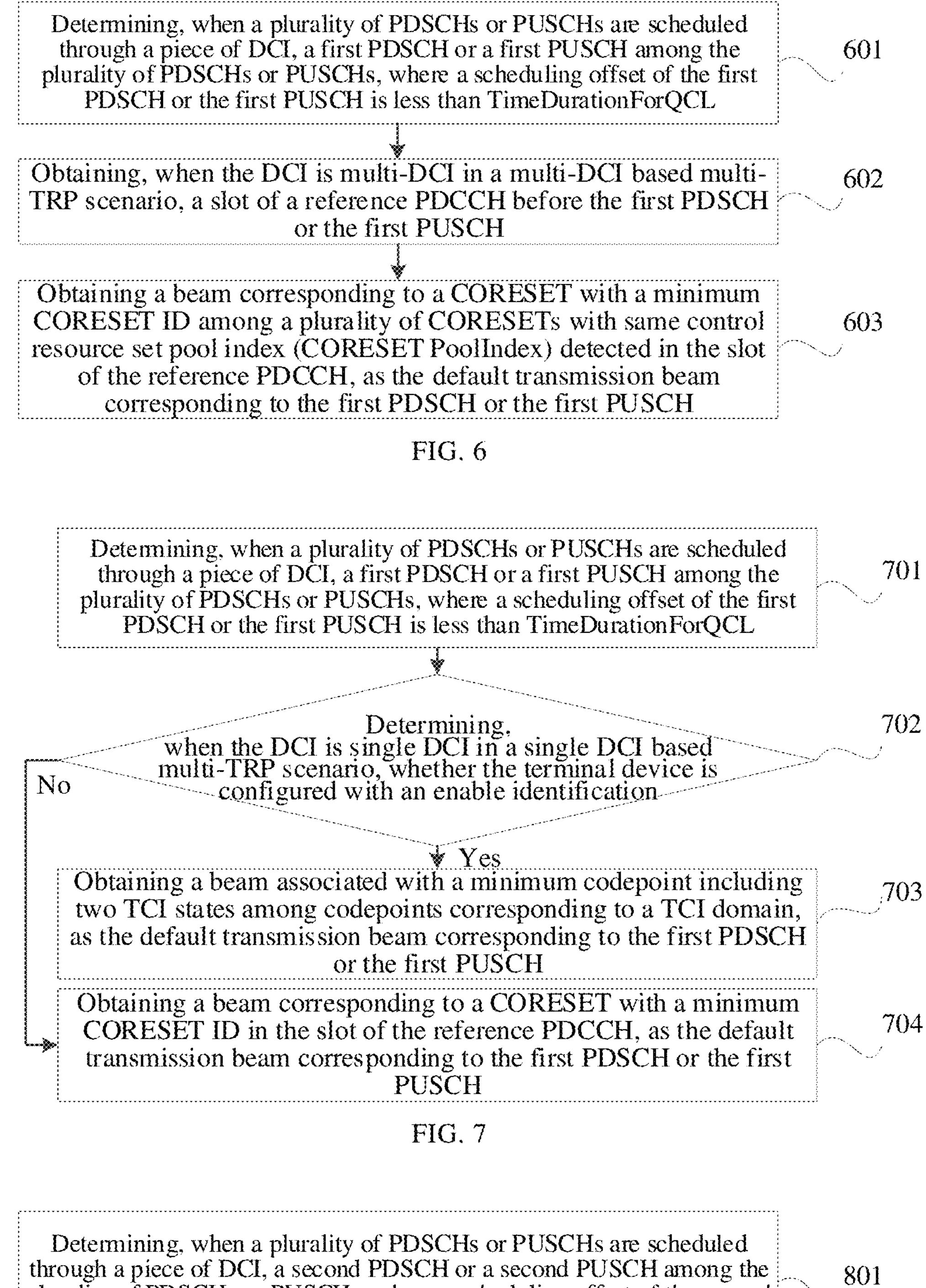
FIG. 6 is a schematic flowchart of another method for beam determination according to some embodiments of the present disclosure.
FIG. 7 is a schematic flowchart of another method for beam determination according to some embodiments of the present disclosure.
FIG. 8 is a schematic flowchart of another method for beam determination according to some embodiments of the present disclosure.

In order to better understand the method for beam determination disclosed in the embodiments of the present disclosure, a communication system to which the embodiments of the present disclosure are applicable is firstly described below.

To make the objectives, technical solutions, and advantages of the present disclosure clearer, the embodiments of the present disclosure are further described below in detail with reference to the accompanying drawings.

Example embodiments will be described in detail here, examples of which are illustrated in the accompanying drawings. The following description refers to the accompanying drawings in which the same numerals in different drawings represent the same or similar elements unless otherwise represented. The implementations described in the following example embodiments do not represent all implementations consistent with the present disclosure. By contrast, they are merely examples of apparatuses and methods consistent with some aspects of the present disclosure as recited in the appended claims.

FIG. 1 is a schematic architectural diagram of a communication system according to some embodiments of the present disclosure. The communication system may include, but is not limited to, a network device and a terminal, and the quantity and form of devices shown in FIG. 1 are only used as an example and do not constitute a limitation on the embodiments of the present disclosure. In actual application, the communication system may include two or more network devices, and two or more terminals. It is taken that one network device 101 and one terminal 102 are included in the communication system shown in FIG. 1 as an example.

It should be noted that the technical solutions of the embodiments of the present disclosure may be applied to various communication systems, such as a long term evolution (LTE) system, a 5th generation (5G) mobile communication system, a 5G new radio (NR) system, or another future new mobile communication system.

The network device 101 in the embodiments of the present disclosure is an entity on a network side for transmitting or receiving a signal. For example, the network device 101 may be an evolved NodeB (eNB), a transmission reception point or transmit receive point (TRP), a next generation NodeB (gNB) in a NR system, a base station in another future mobile communication system or an access node in a wireless fidelity (WiFi) system, or the like. Specific technologies and specific device forms used by the network device are not limited in the embodiments of the present disclosure. The network device provided in the embodiments of the present disclosure may include a central unit (CU) and a distributed unit (DU), where the CU may also be referred to as a control unit. By using the structure of CU-DU, the protocol layer of the network device, such as a base station, may be divided; functions of a part of the protocol layer are located and controlled in the CU; functions of the remaining part or entire part of the protocol layer are distributed in the DU; and the DU is centrally controlled by the CU.

The terminal 102 in the embodiments of the present disclosure is an entity, such as a mobile phone, on a user side for receiving or transmitting a signal. The terminal may also be referred to as user equipment (UE), a mobile station (MS), a mobile terminal (MT), or the like. The terminal may be a vehicle with a communication function, a smart vehicle, a mobile phone, a wearable device, a tablet computer (PAD), a computer with a wireless transceiving function, a virtual reality (VR) terminal, an augmented reality (AR) terminal, a wireless terminal in industrial control, a wireless terminal in self-driving, a wireless terminal in a remote medical surgery, a wireless terminal in a smart grid, a wireless terminal in a transportation security, a wireless terminal in a smart city, a wireless terminal in a smart home, or the like. Specific technologies and specific device forms used by the terminal are not limited in the embodiments of the present disclosure.

In the above communication system, at 52.6-71 GHz, it is supported that a plurality of PDSCHs/PUSCHs are scheduled through a piece of DCI, so as to reduce the overhead of blind detection on a physical downlink control channel (PDCCH), where how to determine the transmission beam corresponding to each PDSCH/PUSCH is very important. Unlike conventional PDSCH aggregation/repetition, each PDSCH/PUSCH is used to transmit a different transport block (TB). In addition, each PDSCH/PUSCH is limited to be within a slot.

For the above situation, it is necessary to specify the beam determination manner for the above PDSCH/PUSCH. That is, due to the fact that the concept of multiple beams is introduced into high frequency band transmission, in addition to a time domain resource position and a frequency domain resource position, the high frequency band transmission is further provided with a spatial domain resource position compared with the low frequency band transmission, where different spatial domain resource positions can be distinguished through different beam directions).

There is a case that the scheduling offset of the PDSCH/PUSCH is less than the time duration for quasi co-location (QCL), i.e., TimeDurationForQCL, as shown in FIG. 2, where the TimeDurationForQCL is the minimum time overhead required for the terminal to receive the PDCCH and receive the PDSCH by using the QCL information in the DCI. In this case, default beams of these PDSCHs needs to be determined. In other words, there is a period of silence period after the DCI is sent, and the terminal may wait and send the service data after the silence period. However, there may also be a case that the configured time for sending the service data is in the silence period, such as the physical downlink shared channel 1 (PDSCH 1) in FIG. 2; at present, it is not determined that which beam is used to transmit the PDSCH 1.

When the scheduling offsets of all PDSCHs/PUSCHs scheduled through a piece of DCI are all greater than or equal to the TimeDurationForQCL, the receive beam/transmit beam corresponding to each PDSCH/PUSCH may be determined according to the beam indicated by the transmission configuration indicator (TCI) domain in the DCI. In the case that the DCI is not provided with the TCI domain, the receive beam/transmit beam corresponding to each PDSCH/PUSCH may be determined according to the beam for scheduling the PDCCH of the PDSCH/PUSCH.

In the related art, for PDSCH aggregation in Rel 15, if a scheduling offset of a PDSCH is less than the TimeDurationForQCL, default beams are used for all PDSCHs. That is, a beam of a control resource set (CORESET) with a minimum CORESET ID in the slot of the PDCCH that needs to be recently detected, is used.

For a repetition transmission policy for a multi-transmission receiving point (mTRP, i.e., multi-TRP) in Rel 16, if a scheduling offset of a PDSCH is less than the TimeDurationForQCL, default beams are used for all PDSCHs. That is, if the terminal is configured with EnableTwoDefaultTCIStates (i.e., EnableTwoDefaultTCIStates-R16), the minimum codepoint that includes two TCI states is determined from all codepoints corresponding to the TCI domain, and the beam associated with the minimum codepoint is used as the default beam corresponding to the PDSCH. If the terminal is not configured with the EnableTwoDefaultTCIStates-R16, the beam corresponding to the CORESET with the minimum CORESET ID in the recent slot in which the PDCCH needs to be detected, is used.

However, during multiple slot (multi-slot) PDSCH scheduling in the current protocol, for the case that a scheduling offset of a PDSCH is less than the TimeDurationForQCL, beams determined in a default manner are used for all PDSCHs, and the beam determined in this default manner is not an optimal beam.

Since the multi-slot PDSCH in the current protocol is used to transmit the same TB, although the optimal beam is not used for transmission, the multi-slot repetition transmission can make the overall transmission performance acceptable. However, for the latest proposed case that a plurality of PDSCHs/PUSCHs are scheduled through a piece of DCI at 52.6-71 GHz, each PDSCH/PUSCH is used to transmit a different TB, that is, there is no repetition gain. If the same default beam determination manner as for the multi-slot PDSCH in the current protocol is used, there may be a large performance loss.

In view of the above problems, the present disclosure provides a method and apparatus for beam determination.

It may be understood that the communication system described in the embodiments of the present disclosure is intended to describe the technical solutions of the embodiments of the present disclosure more clearly, and does not constitute a limitation on the technical solutions provided in the embodiments of the present disclosure. Those of ordinary skill in the art may know that, with the evolution of the system architecture and the occurrence of a new service scenario, the technical solutions provided in the embodiments of the present disclosure are also applicable to similar technical problems.

The method and apparatus for beam determination provided in the present disclosure will be described in detail below with reference to the accompanying drawings.

FIG. 3 is a schematic flowchart of a method for beam determination according to some embodiments of the present disclosure. The method for beam determination may be performed by a terminal in the communication system shown in FIG. 1.

As shown in FIG. 3, the method for beam determination may include, but is not limited to, the following steps.

In step 301, when a plurality of PDSCHs or PUSCHs are scheduled through a piece of DCI, transmission beams corresponding to the plurality of PDSCHs or PUSCHs are determined, where the plurality of PDSCHs or PUSCHs are used to transmit different TBs.

In the embodiments of the present disclosure, the transmission beam may include a receive beam and a transmit beam. When a plurality of PDSCHs are scheduled through a piece of DCI, the transmission beam may be a receive beam, and when a plurality of PUSCHs are scheduled through a piece of DCI, the transmission beam may be a transmit beam.

In the embodiments of the present disclosure, when a plurality of PDSCHs are scheduled through a piece of DCI, a receive beam corresponding to each PDSCH in the plurality of PDSCHs may be determined, where each PDSCH in the plurality of PDSCHs is used to transmit a different TB. Alternatively, when a plurality of PUSCHs are scheduled through a piece of DCI, a transmit beam corresponding to each PUSCH in the plurality of PUSCHs may be determined, where each PUSCH in the plurality of PUSCHs is used to transmit a different TB.

In the method for beam determination in the embodiments of the present disclosure, when a plurality of PDSCHs or PUSCHs are scheduled through a piece of DCI, transmission beams corresponding to the plurality of PDSCHs or PUSCHs are determined, where the plurality of PDSCHs or PUSCHs are used to transmit different TBs. Therefore, the terminal may determine the receive beam corresponding to each PDSCH scheduled through a piece of DCI, or determine the transmit beam corresponding to each PUSCH scheduled through a piece of DCI, so as to communicate with a network device based on the determined beam.

FIG. 4 is a schematic flowchart of another method for beam determination according to some embodiments of the present disclosure. The method for beam determination may be performed by a terminal in the communication system shown in FIG. 1. The method for beam determination may be performed separately, or may be performed in combination with any one of the embodiments or possible implementations in the embodiments of the present disclosure, or may be performed in combination with any one of the technical solutions in the related art.

As shown in FIG. 4, the method for beam determination may include, but is not limited to, the following steps.

In step 401, when a plurality of PDSCHs or PUSCHs are scheduled through a piece of DCI, a first PDSCH or a first PUSCH among the plurality of PDSCHs or PUSCHs is determined, where a scheduling offset of the first PDSCH or the first PUSCH is less than TimeDurationForQCL.

In the embodiments of the present disclosure, when a plurality of PDSCHs are scheduled through a piece of DCI, a first PDSCH with a scheduling offset less than a predefined TimeDurationForQCL may be determined from the plurality of PDSCHs, where the quantity of the first PDSCH may be at least one. Alternatively, when a plurality of PUSCHs are scheduled through a piece of DCI, a first PUSCH with a scheduling offset less than a predefined TimeDurationForQCL may be determined from the plurality of PUSCHs, where the quantity of the first PUSCH may be at least one.

It is taken that a plurality of PDSCHs are scheduled through a piece of DCI as an example for exemplary description. As shown in FIG. 2, the first PDSCH may be the physical downlink shared channel 1 in FIG. 2, that is, the PDSCH 1.

In step 402, a default transmission beam corresponding to the first PDSCH or the first PUSCH is determined.

Among them, the default transmission beam may include a default receive beam and a default transmit beam. When a plurality of PDSCHs are scheduled through a piece of DCI, the default transmission beam may be a default receive beam. When a plurality of PUSCHs are scheduled through a piece of DCI, the default transmission beam may be a default transmit beam.

In the embodiments of the present disclosure, when a plurality of PDSCHs are scheduled through a piece of DCI, a default receive beam corresponding to each first PDSCH may be determined. When a plurality of PUSCHs are scheduled through a piece of DCI, a default transmit beam corresponding to each first PUSCH may be determined.

In the method for beam determination in the embodiments of the present disclosure, when a plurality of PDSCHs or PUSCHs are scheduled through a piece of DCI, a first PDSCH or a first PUSCH among the plurality of PDSCHs or PUSCHs is determined, where a scheduling offset of the first PDSCH or the first PUSCH is less than TimeDurationForQCL; and a default transmission beam corresponding to the first PDSCH or the first PUSCH is determined. Therefore, the terminal can determine the default transmission beam corresponding to the first PDSCH or the first PUSCH with a scheduling offset less than TimeDurationForQCL.

It should be noted that the foregoing possible implementations may be performed separately, or may be combined to be performed, which is not limited in the embodiments of the present disclosure.

Referring to FIG. 5, FIG. 5 is a schematic flowchart of another method for beam determination according to some embodiments of the present disclosure. The method for beam determination may be performed by a terminal in the communication system shown in FIG. 1. The method for beam determination may be performed separately, or may be performed in combination with any one of the embodiments or possible implementations in the embodiments of the present disclosure, or may be performed in combination with any one of the technical solutions in the related art.

As shown in FIG. 5, the method for beam determination may include, but is not limited to, the following steps.

In step 501, when a plurality of PDSCHs or PUSCHs are scheduled through a piece of DCI, a first PDSCH or a first PUSCH among the plurality of PDSCHs or PUSCHs is determined, where a scheduling offset of the first PDSCH or the first PUSCH is less than TimeDurationForQCL.

In the embodiments of the present disclosure, step 501 may be implemented by using any manner of various embodiments of the present disclosure, which is not limited in the embodiments of the present disclosure, and is not repeated here.

In step 502, when the DCI is single DCI in a single TRP scenario, a slot of a reference PDCCH before the first PDSCH or the first PUSCH is obtained.

In the embodiment of the present disclosure, when a plurality of PDSCHs are scheduled through a piece of DCI, in response to determining that the DCI is single DCI in a single TRP scenario, a slot of a reference PDCCH before the first PDSCH may be obtained, where the reference PDCCH may be a PDCCH that needs to be detected recently before the first PDSCH.

Similarly, when a plurality of PUSCHs are scheduled through a piece of DCI, in response to determining that the DCI is single DCI in a single TRP scenario, a slot of a reference PDCCH before the first PUSCH may be obtained, where the reference PDCCH may be a PDCCH that needs to be detected recently before the first PUSCH.

In step 503, a beam corresponding to the CORESET with a minimum CORESET ID detected in the slot of the reference PDCCH, is obtained and used as the default transmission beam corresponding to the first PDSCH or the first PUSCH.

In the embodiment of the present disclosure, when a plurality of PDSCHs are scheduled through a piece of DCI, a beam corresponding to the CORESET with a minimum CORESET ID detected in the slot of the reference PDCCH may be obtained and used as the default receive beam corresponding to the first PDSCH, where the reference PDCCH is a PDCCH that needs to be detected recently before the first PDSCH.

Similarly, when a plurality of PUSCHs are scheduled through a piece of DCI, a beam corresponding to a CORESET with a minimum CORESET ID detected in the slot of the reference PDCCH may be obtained and used as the default transmit beam corresponding to the first PUSCH, where the reference PDCCH is a PDCCH that needs to be detected recently before the first PUSCH.

In the method for beam determination in the embodiments of the present disclosure, when a plurality of PDSCHs or PUSCHs are scheduled through a piece of DCI, a first PDSCH or a first PUSCH among the plurality of PDSCHs or PUSCHs is determined, where a scheduling offset of the first PDSCH or the first PUSCH is less than TimeDurationForQCL. When the DCI is single DCI in a single TRP scenario, a slot of a reference PDCCH before the first PDSCH or the first PUSCH is obtained; and a beam corresponding to the CORESET with a minimum CORESET ID detected in the slot of the reference PDCCH, is obtained and used as the default transmission beam corresponding to the first PDSCH or the first PUSCH. Therefore, the terminal can determine the default transmission beam corresponding to the first PDSCH or the first PUSCH with a scheduling offset less than TimeDurationForQCL.

It should be noted that the foregoing possible implementations may be performed separately, or may be combined to be performed, which is not limited in the embodiments of the present disclosure.

Referring to FIG. 6, FIG. 6 is a schematic flowchart of another method for beam determination according to some embodiments of the present disclosure. The method for beam determination may be performed by a terminal in the communication system shown in FIG. 1. The method for beam determination may be performed separately, or may be performed in combination with any one of the embodiments or possible implementations in the embodiments of the present disclosure, or may be performed in combination with any one of the technical solutions in the related art.

As shown in FIG. 6, the method for beam determination may include, but is not limited to, the following steps.

In step 601, when a plurality of PDSCHs or PUSCHs are scheduled through a piece of DCI, a first PDSCH or a first PUSCH among the plurality of PDSCHs or PUSCHs is determined, where a scheduling offset of the first PDSCH or the first PUSCH is less than TimeDurationForQCL.

In the embodiments of the present disclosure, step 601 may be implemented by using any manner of various embodiments of the present disclosure, which is not limited in the embodiments of the present disclosure, and is not repeated here.

In step 602, when the DCI is multi-DCI in a multi-DCI based multi-TRP scenario, a slot of a reference PDCCH before the first PDSCH or the first PUSCH is obtained.

In the embodiments of the present disclosure, when a plurality of PDSCHs are scheduled through a piece of DCI, in response to determining that the DCI is a piece of DCI among the multi-DCI in the multi-DCI based multi-TRP scenario, a slot of a reference PDCCH before the first PDSCH may be obtained, where the reference PDCCH may be a PDCCH that needs to be detected recently before the first PDSCH.

Similarly, when a plurality of PUSCHs are scheduled through a piece of DCI, in response to determining that the DCI is a piece of DCI among the multi-DCI in the multi-DCI based multi-TRP scenario, a slot of a reference PDCCH before the first PUSCH may be obtained, where the reference PDCCH may be a PDCCH that needs to be detected recently before the first PUSCH.

In step 603, a beam corresponding to a CORESET with a minimum CORESET ID among a plurality of CORESETs with the same control resource set pool index (CORESET PoolIndex) that is detected in the slot of the reference PDCCH, is obtained and used as the default transmission beam corresponding to the first PDSCH or the first PUSCH.

In the embodiments of the present disclosure, when a plurality of PDSCHs are scheduled through a piece of DCI, a beam corresponding to a CORESET with a minimum CORESET ID among a plurality of CORESETs with the same CORESET PoolIndex that is detected in the slot of the reference PDCCH may be obtained and used as the default receive beam corresponding to the first PDSCH, where the reference PDCCH is a PDCCH that needs to be detected recently before the first PDSCH.

Similarly, when a plurality of PUSCHs are scheduled through a piece of DCI, a beam corresponding to a CORESET with a minimum CORESET ID among a plurality of CORESETs with the same CORESET PoolIndex that is detected in the slot of the reference PDCCH may be obtained and used as the default transmit beam corresponding to the first PUSCH, where the reference PDCCH is a PDCCH that needs to be detected recently before the first PUSCH.

In the method for beam determination of the embodiments of the present disclosure, when a plurality of PDSCHs or PUSCHs are scheduled through a piece of DCI, a first PDSCH or a first PUSCH among the plurality of PDSCHs or PUSCHs is determined, where a scheduling offset of the first PDSCH or the first PUSCH is less than TimeDurationForQCL. When the DCI is multi-DCI in a multi-DCI based mTRP scenario, a slot of a reference PDCCH before the first PDSCH or the first PUSCH is obtained; and, a beam corresponding to a CORESET with a minimum CORESET ID among a plurality of CORESETs with the same CORESET PoolIndex that is detected in the slot of the reference PDCCH, is obtained and used as the default transmission beam corresponding to the first PDSCH or the first PUSCH. Therefore, the terminal can determine the default transmission beam corresponding to the first PDSCH or the first PUSCH with a scheduling offset less than TimeDurationForQCL.

It should be noted that the foregoing possible implementations may be performed separately, or may be combined to be performed, which is not limited in the embodiments of the present disclosure.

Referring to FIG. 7, FIG. 7 is a schematic flowchart of another method for beam determination according to some embodiments of the present disclosure. The method for beam determination may be performed by a terminal in the communication system shown in FIG. 1. The method for beam determination may be performed separately, or may be performed combined with any one of the embodiments or possible implementations in the embodiments of the present disclosure, or may be performed combined with any one of the technical solutions in the related art.

As shown in FIG. 7, the method for beam determination may include, but is not limited to, the following steps.

In step 701, when a plurality of PDSCHs or PUSCHs are scheduled through a piece of DCI, a first PDSCH or a first PUSCH among the plurality of PDSCHs or PUSCHs is determined, where a scheduling offset of the first PDSCH or the first PUSCH is less than TimeDurationForQCL.

In the embodiments of the present disclosure, step 701 may be implemented by using any manner of various embodiments of the present disclosure, which is not limited in the embodiments of the present disclosure, and is not repeated here.

In step 702, when the DCI is single DCI in a single DCI based mTRP scenario, it is determined whether the terminal is configured with an enable identification of EnableTwoDefaultTCIstates or not; if yes, step 703 is performed, and if not, step 704 is performed.

Among them, the enable identification of EnableTwoDefaultTCIstates is used to identify that the terminal is allowed to adopt two default TCI states.

In the embodiment of the present disclosure, when the DCI is single DCI in a single DCI based multi-TRP scenario, it may be determined whether the terminal is configured with an enable identification of EnableTwoDefaultTCIstates; for example, by taking that the terminal is a terminal complying to the R16 standard as an example, the enable identification may be EnableTwoDefaultTCIstates-R16, where the enable identification is used to identify that the terminal is allowed to adopt two default TCI states.

In step 703, in response to determining that the terminal is configured with the EnableTwoDefaultTCIstates, a beam associated with a minimum codepoint that includes two TCI states among codepoints corresponding to the TCI domain, is obtained and used as the default transmission beam corresponding to the first PDSCH or the first PUSCH.

In the embodiment of the present disclosure, in response to determining that the terminal is configured with EnableTwoDefaultTCIStates, a beam associated with a minimum codepoint that includes two TCI states among codepoints corresponding to the TCI domain, is obtained and used as the default transmission beam corresponding to the first PDSCH or the first PUSCH.

In step 704, in response to determining that the terminal is not configured with the EnableTwoDefaultTCIstates, a beam corresponding to a CORESET with a minimum CORESET ID in the slot of the reference PDCCH, is obtained and used as the default transmission beam corresponding to the first PDSCH or the first PUSCH.

In the embodiment of the present disclosure, in response to determining that the terminal is not configured with EnableTwoDefaultTCIStates, the beam corresponding to the CORESET with a minimum CORESET ID in the slot of the reference PDCCH, is obtained and used as the default transmission beam corresponding to the first PDSCH or the first PUSCH. Among them, when a plurality of PDSCHs are scheduled through a piece of DCI, the reference PDCCH is a PDCCH that needs to be detected recently before the first PDSCH; and when a plurality of PUSCHs are scheduled through a piece of DCI, the reference PDCCH is a PDCCH that needs to be detected recently before the first PUSCH.

In the method for beam determination of the embodiments of the present disclosure, when a plurality of PDSCHs or PUSCHs are scheduled through a piece of DCI, a first PDSCH or a first PUSCH among the plurality of PDSCHs or PUSCHs is determined, where a scheduling offset of the first PDSCH or the first PUSCH is less than TimeDurationForQCL. When the DCI is single DCI in a single DCI based multi-TRP scenario, it is determined whether the terminal is configured with an enable identification of EnableTwoDefaultTCIstates, where the enable identification is used to identify that the terminal is allowed to adopt two default TCI states; in response to determining that the terminal is configured with EnableTwoDefaultTCIStates, a beam associated with a minimum codepoint that includes two TCI states among codepoints corresponding to the TCI domain, is obtained and used as the default transmission beam corresponding to the first PDSCH or the first PUSCH; and in response to determining that the terminal is not configured with EnableTwoDefaultTCIStates, a beam corresponding to the CORESET with a minimum CORESET ID in the slot of the reference PDCCH, is obtained and used as the default transmission beam corresponding to the first PDSCH or the first PUSCH. Therefore, the terminal can determine the default transmission beam corresponding to the first PDSCH or the first PUSCH with a scheduling offset less than TimeDurationForQCL.

It should be noted that the foregoing possible implementations may be performed separately, or may be combined to be performed, which is not limited in the embodiments of the present disclosure.

In any embodiment of the present disclosure, when a plurality of PDSCHs or PUSCHs are scheduled through a piece of DCI, for a first PDSCH or a first PUSCH with a scheduling offset value less than TimeDurationForQCL (such as the physical downlink shared channel 1 in FIG. 2, that is, PDSCH 1), the default transmission beam corresponding to the first PDSCH or the first PUSCH may be determined by using the following manners.

That is, there are the following cases.

In a first case, when the DCI is single DCI in a single TRP scenario, the beam corresponding to the CORESET with a minimum CORESET ID detected in the slot of a PDCCH that needs to be detected recently before the first PDSCH or the first PUSCH, which is denoted as a reference PDCCH in the present disclosure, may be determined and used as the default transmission beam corresponding to the first PDSCH or the first PUSCH.

In a second case, when the DCI is multi-DCI in a multi-DCI based multi-TRP scenario, the beam corresponding to the CORESET with a minimum CORESET ID among a plurality of CORESETs with the same CORESET PoolIndex that is detected in the slot of the reference PDCCH may be determined and used as the default transmission beam corresponding to the first PDSCH or the first PUSCH.

In a third case, when the DCI is single DCI in a single DCI based multi-TRP scenario, it may be determined whether the terminal is configured with an enable identification of EnableTwoDefaultTCIstates or not. For example, by taking that the terminal is a terminal complying to the R16 standard as an example, the enable identification may be EnableTwoDefaultTCIstates-R16, where the enable identification is used to identify that the terminal is allowed to adopt two default TCI states.

In response to determining that the terminal is configured with EnableTwoDefaultTCIStates, a beam associated with a minimum codepoint that includes two TCI states among codepoints corresponding to a TCI domain is used as the default transmission beam corresponding to the first PDSCH or the first PUSCH. Among them, the corresponding relationship (or referred to as the mapping relationship) between the two TCI states corresponding to the codepoint and the first PDSCH is the same as the corresponding relationship of the frequency division multiplexing scheme A (FDMSchemeA), the FDMSchemeB, the time division multiplexing scheme A (TDMSchemeA) and the TDMSchemeB in the current protocol, without considering to adopt the mapping relationship of the repetition transmission scheme.

In response to determining that the terminal is not configured with the enable identification of EnableTwoDefaultTCIStates, a beam corresponding to the CORESET with a minimum CORESET ID in the slot of the reference PDCCH is used as the default transmission beam corresponding to the first PDSCH or the first PUSCH.

Referring to FIG. 8, FIG. 8 is a schematic flowchart of another method for beam determination according to some embodiments of the present disclosure. The method for beam determination may be performed by a terminal in the communication system shown in FIG. 1. The method for beam determination may be performed separately, or may be performed combined with any one of the embodiments or possible implementations in the embodiments of the present disclosure, or may be performed combined with any one of the technical solutions in the related art.

As shown in FIG. 8, the method for beam determination may include, but is not limited to, the following steps.

In step 801, when a plurality of PDSCHs or PUSCHs are scheduled through a piece of DCI, a second PDSCH or a second PUSCH among the plurality of PDSCHs or PUSCHs is determined, where a scheduling offset of the second PDSCH or the second PUSCH is less than TimeDurationForQCL.

In the embodiments of the present disclosure, when a plurality of PDSCHs are scheduled through a piece of DCI, a second PDSCH with a scheduling offset greater than or equal to a predefined TimeDurationForQCL may be determined from the plurality of PDSCHs, where the quantity of the second PDSCH may be at least one. Alternatively, when a plurality of PUSCHs are scheduled through the first DCI, a second PUSCH with a scheduling offset greater than or equal to a predefined TimeDurationForQCL may be determined from the plurality of PUSCHs, where the quantity of the second PUSCH may be at least one.

Taking that a plurality of PDSCHs are scheduled through a piece of DCI as an example, as shown in FIG. 2, the second PDSCHs may be the physical downlink shared channel 2 (i.e., PDSCH 2), the physical downlink shared channel 3 (i.e., PDSCH 3), and the physical downlink shared channel 4 (i.e., PDSCH 4) in FIG. 2.

In step 802, a transmission beam corresponding to a second PDSCH or a second PUSCH is determined.

In the embodiments of the present disclosure, when a plurality of PDSCHs are scheduled through a piece of DCI, a receive beam corresponding to each second PDSCH may be determined; or, when a plurality of PUSCHs are scheduled through a piece of DCI, a transmit beam corresponding to each second PUSCH may be determined.

In some embodiments of the embodiments of the present disclosure, in the case that the DCI is provided with a TCI domain, a beam indicated by the TCI domain in the DCI may be used as a transmission beam corresponding to the second PDSCH or the second PUSCH.

In another possible implementation of the embodiments of the present disclosure, in the case that the DCI is not provided with a TCI domain, when a plurality of PDSCHs are scheduled through a piece of DCI, a beam for scheduling a PDCCH of the second PDSCH may be used as a receive beam corresponding to the second PDSCH. Similarly, when a plurality of PUSCHs are scheduled through a piece of DCI, a beam for scheduling a PDCCH of the second PUSCH may be used as a transmit beam corresponding to the second PUSCH.

In still another possible implementation of the embodiments of the present disclosure, in the case that the DCI is not provided with a TCI domain, a default transmission beam of the second PDSCH or the second PUSCH may be determined according to a same manner as for the first PDSCH or the first PUSCH; that is, a same beam as the beam of the first PDSCH may be used for the second PDSCH, and a same beam as the beam of the first PUSCH may be used for the second PUSCH.

In the method for beam determination of the embodiments of the present disclosure, when a plurality of PDSCHs or PUSCHs are scheduled through a piece of DCI, a second PDSCH or a second PUSCH among the plurality of PDSCHs or PUSCHs is determined, where a scheduling offset of the second PDSCH or the second PUSCH is greater than or equal to Time DurationForQCL; and, a transmission beam corresponding to the second PDSCH or the second PUSCH is determined. Therefore, the terminal can determine the default receive beam corresponding to the second PDSCH with a scheduling offset greater than or equal to TimeDurationForQCL, or determine the default transmit beam corresponding to the second PUSCH with a scheduling offset greater than or equal to TimeDurationForQCL.

It should be noted that the foregoing possible implementations may be performed separately, or may be combined to be performed, which is not limited in the embodiments of the present disclosure.

In any embodiment of the present disclosure, when a plurality of PDSCHs or PUSCHs are scheduled through a piece of DCI, for a second PDSCH or a second PUSCH with a scheduling offset greater than or equal to TimeDurationForQCL (such as the physical downlink shared channels 2, 3 and 4 in FIG. 2, that is, PDSCH 2, PDSCH 3, and PDSCH 4), a transmission beam corresponding to the second PDSCH or the second PUSCH may be determined by using the following manners.

Manner 1: a beam indicated by a TCI domain in the DCI is used as a transmission beam corresponding to a second PDSCH or a second PUSCH.

Manner 2: in the case that the DCI is not provided with a TCI domain, a beam for scheduling the PDCCH of the second PDSCH is used as a receive beam corresponding to the second PDSCH; or, the beam for scheduling the PDCCH of the second PUSCH is used as a transmit beam corresponding to the second PUSCH.

Manner 3: a default transmission beam of the second PDSCH or the second PUSCH is determined according to the same manner as for the first PDSCH or the first PUSCH.

Referring to FIG. 9, FIG. 9 is a schematic flowchart of another method for beam determination according to some embodiments of the present disclosure. The method for beam determination may be performed by a terminal in the communication system shown in FIG. 1. The method for beam determination may be performed separately, or may be performed in combination with any one of the embodiments or possible implementations in the embodiments of the present disclosure, or may be performed in combination with any one of the technical solutions in the related art.

As shown in FIG. 9, the method for beam determination may include, but is not limited to, the following steps.

In step 901, when a plurality of PDSCHs or PUSCHs are scheduled through a piece of DCI, a second PDSCH or a second PUSCH among the plurality of PDSCHs or PUSCHs is determined, where a scheduling offset of the second PDSCH or the second PUSCH is greater than or equal to TimeDurationForQCL.

In the embodiments of the present disclosure, step 901 may be implemented by using any manner of various embodiments of the present disclosure, which is not limited in the embodiments of the present disclosure, and is not repeated here.

In step 902, a quantity of the second PDSCH or the second PUSCH is obtained, or a proportion of the second PDSCH or the second PUSCH among the plurality of PDSCHs or PUSCHs is obtained.

In the embodiment of the present disclosure, when a plurality of PDSCHs are scheduled through a piece of DCI, the quantity of the second PDSCH may be determined, or the proportion of the second PDSCH among the plurality of PDSCHs may be determined. Taking that four PDSCHs are scheduled through a piece of DCI as an example, as shown in FIG. 2, the quantity of the second PDSCH is 3, and the proportion of the second PDSCH among the plurality of PDSCHs is ¾=75%.

Similarly, when a plurality of PUSCHs are scheduled through a piece of DCI, a quantity of the second PUSCH may be determined, or the proportion of the second PUSCH among the plurality of PUSCH may be determined.

In step 903, when the quantity of the second PDSCH or the second PUSCH is greater than or equal to a quantity threshold, or the proportion of the second PDSCH or the second PUSCH among the plurality of PDSCHs or PUSCHs is greater than or equal to a proportion threshold, a transmission beam corresponding to the second PDSCH or the second PUSCH is determined by using manner 1 or manner 2.

Among them, the quantity threshold and the proportion threshold may be preset, for example, may be agreed through a protocol, or may be configured by a network device and sent to the terminal.

In the embodiments of the present disclosure, when a plurality of PDSCHs are scheduled through a piece of DCI, in response to determining that the quantity of the second PDSCH is greater than or equal to the quantity threshold, or the proportion of the second PDSCH among the plurality of PDSCHs is greater than or equal to the proportion threshold, a receive beam corresponding to the second PDSCH may be determined by using manner 1 or manner 2.

That is, in a case that the DCI is provided with a TCI domain, a beam indicated by the TCI domain in the DCI may be used as a receive beam corresponding to the second PDSCH. In a case that the DCI is not provided with a TCI domain, a beam for scheduling the PDCCH of the second PDSCH may be used as a receive beam corresponding to the second PDSCH.

Similarly, when a plurality of PUSCHs are scheduled through a piece of DCI, in response to determining that the quantity of the second PUSCH is greater than or equal to the quantity threshold, or the proportion of the second PUSCH among the plurality of PUSCHs is greater than or equal to the proportion threshold, a transmit beam corresponding to the second PUSCH may be determined by using manner 1 or a manner 2.

That is, in a case that the DCI is provided with a TCI domain, a beam indicated by the TCI domain in the DCI may be used as a transmit beam corresponding to the second PUSCH. In a case that the DCI is not provided with a TCI domain, a beam for scheduling the PDCCH of the second PUSCH may be used as a transmit beam corresponding to the second PUSCH.

In step 904, when the quantity of the second PDSCH or the second PUSCHs is less than the quantity threshold, or the proportion of the second PDSCH or the second PUSCH among the plurality of PDSCHs or PUSCHs is less than the proportion threshold, a transmit beam corresponding to the second PDSCH or the second PUSCH may be determined by using manner 3.

In the embodiment of the present disclosure, when a plurality of PDSCHs are scheduled through a piece of DCI, in response to determining that the quantity of the second PDSCH is less than the quantity threshold, or the proportion of the second PDSCH among the plurality of PDSCHs is less the proportion threshold, a receive beam corresponding to the second PDSCH may be determined by using manner 3. That is, in a case that the DCI is not provided with a TCI domain, a default receive beam of the second PDSCH may be determined according to the same manner as for the first PDSCH.

By taking that a plurality of PDSCHs are scheduled through a piece of DCI as an example, as shown in FIG. 10, the second PDSCH may be the physical downlink shared channel 4 in FIG. 10, that is, the PDSCH 4. The quantity of the second PDSCH is 1, and the proportion of the second PDSCH among the plurality of PDSCHs is ¼=25%. Assuming that the quantity threshold is 2, and the proportion threshold is 50%, the receive beam corresponding to the second PDSCH may be determined by using manner 3.

In an example, when the DCI is single DCI in a single TRP scenario, the beam corresponding to the CORESET with a minimum CORESET ID detected in the slot of a PDCCH that needs to be detected recently before the second PDSCH, which is denoted as a reference PDCCH in the present disclosure, may be determined and used as the default receive beam corresponding to the second PDSCH.

In another example, when the DCI is multi-DCI in a multi-DCI based multi-TRP scenario, a beam corresponding to the CORESET with a minimum CORESET ID among the plurality of CORESETs with the same CORESET PoolIndex detected in the slot of the PDCCH that needs to be detected recently before the second PDSCH, that is, the reference PDCCH, may be determined and used as the default receive beam corresponding to the second PDSCH.

In still another example, when the DCI is single DCI in a single DCI based multi-TRP scenario, it may be determined whether the terminal is configured with an enable identification of EnableTwoDefaultTCIStates or not. In response to determining that the terminal is configured with EnableTwoDefaultTCIStates, the beam associated with a minimum codepoint including two TCI states among the codepoints corresponding to the TCI domain is used as the default receive beam corresponding to the second PDSCH. In response to determining that the terminal is not configured with the enable identification of EnableTwoDefaultTCIStates, the beam corresponding to the CORESET with a minimum CORESET ID in the slot of the reference PDCCH is used as the default receive beam corresponding to the second PDSCH.

Similarly, when a plurality of PUSCHs are scheduled through a piece of DCI, in response to determining that a quantity of second PUSCH is less than a quantity threshold, or a proportion of the second PUSCH among the plurality of PUSCHs is less than a proportion threshold, a transmit beam corresponding to the second PUSCH may be determined by using manner 3. That is, in a case that the DCI is not provided with TCI domain, a default transmit beam of the second PUSCH may be determined in the same manner as for the first PUSCH.

In an example, when the DCI is single DCI in a single TRP scenario, the beam corresponding to the CORESET with a minimum CORESET ID detected in the slot of a PDCCH that needs to be recently detected before the second PUSCH, which is denoted as a reference PDCCH in the present disclosure, may be determined and used as the default transmit beam corresponding to the second PUSCH.

In another example, when the DCI is multi-DCI in a multi-DCI based multi-TRP scenario, the beam corresponding to the CORESET with a minimum CORESET ID among the plurality of CORESETs with the same CORESET PoolIndex detected in the slot of a PDCCH that needs to be recently detected before the second PUSCH, which is denoted as a reference PDCCH in the present disclosure, may be determined and used as the default transmit beam corresponding to the second PUSCH.

In still another example, when the DCI is single DCI in a single DCI based multi-TRP scenario, it may be determined whether the terminal is configured with an enable identification of EnableTwoDefaultTCIStates or not. In response to determining that the terminal is configured with EnableTwoDefaultTCIStates, the beam associated with a minimum codepoint including two TCI states among the codepoints corresponding to the TCI domain, is used as the default transmit beam corresponding to the second PUSCH. In response to determining that the terminal is not configured to enable identification of EnableTwoDefaultTCIStates, the beam corresponding to the CORESET with a minimum CORESET ID in the slot of the reference PDCCH, is used as the default transmit beam corresponding to the second PUSCH.

In any embodiment of the present disclosure, when a plurality of PDSCHs/PUSCHs are scheduled through a piece of DCI, it may be determined whether to use a single QCL assumption or a multiple QCL assumption to determine a beam corresponding to each PDSCH/PUSCH according to a quantity or proportion of the second PDSCH of the second PUSCH.

Among them, the single QCL assumption refers to that the beam used for the second PDSCH is the same as that for the first PDSCH, or the beam used for the second PUSCH is the same as that for the first PUSCH; that is, the beam used for the second PDSCH/the second PUSCH is determined by using manner 3. Multiple QCL assumption refers to that the beam used for the second PDSCH/the second PUSCH is determined by using manner 1 or manner 2.

In an example, when the quantity of the second PDSCH is greater than or equal to the quantity threshold, or the proportion of the second PDSCH among the plurality of PDSCHs is greater than or equal to the proportion threshold, the beam corresponding to the second PDSCH may be determined by using the multiple QCL assumption; and on the contrary, the beam corresponding to the second PDSCH may be determined by using the single QCL assumption.

Similarly, when the quantity of the second PUSCH is greater than or equal to the quantity threshold, or the proportion of the second PUSCH in the plurality of PUSCHs is greater than or equal to the proportion threshold, the beam corresponding to the second PUSCH may be determined by using the multiple QCL assumption; and on the contrary, the beam corresponding to the second PUSCH may be determined by using the single QCL assumption.

Among them, when the multiple QCL assumption is used, the default transmit beam or the default receive beam may be determined by using manner 1 or a manner 2.

When the single QCL assumption is used, the default transmit beam or the default receive beam may be determined by using manner 3.

In any embodiment of the present disclosure, when the boundary value of the TimeDurationForQCL (i.e., a cut-off time) is within a certain slot, the PDSCH/PUSCH of this slot is a PDSCH/PUSCH with a scheduling offset less than TimeDurationForQCL; that is, the PDSCH/PUSCH in this slot belongs to the first PDSCH or the first PUSCH in the present disclosure.

In conclusion, the default transmit beam or the default receive beam is determined by introducing the multiple QCL assumption, and the optimal performance may be obtained by using the indicated beam for the second PDSCH with a scheduling offset value greater than or equal to TimeDurationForQCL.

In the method for beam determination in the embodiments of the present disclosure, a quantity of the second PDSCH or the second PUSCH, or a proportion of the second PDSCH or the second PUSCH among the plurality of PDSCHs or PUSCHs is obtained; when the quantity of the second PDSCH or the second PUSCH is greater than or equal to a quantity threshold, or the proportion of the second PDSCH or the second PUSCH among the plurality of PDSCHs or PUSCHs is greater than or equal to a proportion threshold, a transmission beam corresponding to the second PDSCH or the second PUSCH is determined by using manner 1 or manner 2; and when the quantity of the second PDSCH or the second PUSCH is less than the quantity threshold, or the proportion of the second PDSCH or the second PUSCH among the plurality of PDSCHs or PUSCHs is less than the proportion threshold, a transmission beam corresponding to the second PDSCH or the second PUSCH is determined by using manner 3. Therefore, the terminal can determine the default transmission beam corresponding to the second PDSCH or the second PUSCH with a scheduling offset greater than or equal to TimeDurationForQCL.

It should be noted that the foregoing possible implementations may be performed separately, or may be performed in combination with each other, which is not limited in the embodiments of the present disclosure.

In any embodiment of the present disclosure, when the scheduling offsets of a plurality of PDSCHs or PUSCHs that are scheduled through a piece of DCI, are all greater than TimeDurationForQCL, the transmission beam corresponding to each PDSCH or PUSCH may be determined by using manner 1 or manner 2. That is, in a case that the DCI is provided with a TCI domain, a beam indicated by the TCI domain is used as a receive beam corresponding to each PDSCH or a transmit beam corresponding to each PUSCH; and in a case that the DCI is not provided with a TCI domain, a beam for scheduling the PDCCH of the PDSCH is used as a receive beam corresponding to the PDSCH, or a beam for scheduling the PDCCH of the PUSCH is used as a transmit beam corresponding to the PUSCH.

In the embodiments provided in the present disclosure, the method provided in the embodiments of the present disclosure is described from the perspective of the terminal. To implement functions in the method provided in the embodiments of the present disclosure, the terminal may include a hardware structure and a software module, and the foregoing functions are implemented in a form of a hardware structure, a software module, or a hardware structure plus a software module. A certain function in the foregoing functions may be performed in a form of a hardware structure, a software module, or a hardware structure plus a software module.

FIG. 11 is a schematic structural diagram of an apparatus 110 for beam determination according to some embodiments of the present disclosure. The apparatus for beam determination 110 shown in FIG. 11 may include a processing unit 1101. In some embodiments, the apparatus 110 for beam determination may also include a transceiving unit, and the transceiving unit may include a transmitting unit and/or a receiving unit. The transmitting unit is configured to implement a transmitting function, the receiving unit is configured to implement a receiving function, and the transceiving unit may implement a transmitting function and/or a receiving function.

The apparatus 110 for beam determination may be a terminal, or may be an apparatus in a terminal, or may be an apparatus that can be used in matching with a terminal.

The apparatus 110 for beam determination is a terminal; and the processing unit 1101 is configured to, when a plurality of physical downlink shared channels (PDSCHs) or physical uplink shared channels (PUSCHs) are scheduled through a piece of downlink control information (DCI), determine transmission beams corresponding to the plurality of PDSCHs or PUSCHs, where the plurality of PDSCHs or PUSCHs are used to transmit different transmission blocks (TB).

In some embodiments, the processing unit 1101 is configured to: determine a first PDSCH or a first PUSCH among the plurality of PDSCHs or PUSCHs, where a scheduling offset of the first PDSCH or the first PUSCH is less than a time duration for quasi co-location (TimeDurationForQCL); and determine a default transmission beam corresponding to the first PDSCH or the first PUSCH.

In some embodiments, the processing unit 1101 is configured to: when the DCI is single DCI in a single TRP scenario, obtain a slot of a reference PDCCH before the first PDSCH or the first PUSCH; and obtain a beam corresponding to a control resource set (CORESET) with a minimum CORESET ID detected in the slot of the reference PDCCH, as a default transmission beam corresponding to the first PDSCH or the first PUSCH.

In some embodiments, the processing unit 1101 is configured to: when the DCI is multi-DCI in a multi-DCI based multi-TRP scenario, obtain a slot of a reference PDCCH before the first PDSCH or the first PUSCH; and obtain a beam corresponding to the CORESET with a minimum CORESET ID among the plurality of CORESETs with the same control resource set pool index (CORESET PoolIndex) that is detected in the slot of the reference PDCCH, as a default transmission beam corresponding to the first PDSCH or the first PUSCH.

In some embodiments, the processing unit 1101 is configured to: when the DCI is single DCI in a single DCI based multi-TRP scenario, determine whether the terminal is configured with an enable identification of EnableTwoDefaultTCIstates or not, where the enable identification is used to identify that the terminal is allowed to adopt two default TCI states; in response to determining that the terminal is configured with EnableTwoDefaultTCIStates, obtain a beam associated with a minimum codepoint including two TCI states in codepoints corresponding to the TCI domain, as a default transmission beam corresponding to the first PDSCH or the first PUSCH; and, in response to determining that the terminal is not configured with EnableTwoDefaultTCIStates, obtain a beam corresponding to the CORESET with a minimum CORESET ID in the slot of the reference PDCCH, as a default transmission beam corresponding to the first PDSCH or the first PUSCH.

In some embodiments, the reference PDCCH is a PDCCH that needs to be detected recently before the first PDSCH or the first PUSCH.

In some embodiments, the processing unit 1101 is configured to: determine a second PDSCH or a second PUSCH among the plurality of PDSCHs or PUSCHs, where a scheduling offset of the second PDSCH or the second PUSCH is greater than or equal to Time DurationForQCL; and determine a transmission beam corresponding to the second PDSCH or the second PUSCH.

In some embodiments, the processing unit 1101 is configured to determine a transmission beam corresponding to the second PDSCH or the second PUSCH according to any one of the following manners.

Manner 1: in a case that the DCI is provided with a transmission configuration indicator (TCI) domain, a beam indicated by the TCI domain is used as a transmission beam corresponding to the second PDSCH or the second PUSCH;

Manner 2: in a case that the DCI is not provided with the TCI domain, a beam for scheduling a physical downlink control channel (PDCCH) of the second PDSCH or the second PUSCH is used as a transmission beam corresponding to the second PDSCH or the second PUSCH; and Manner 3: in a case that the DCI is not provided with the TCI domain, the default transmission beam of the second PDSCH or the second PUSCH is determined according to the same manner as for the first PDSCH or the first PUSCH.

In some embodiments, the processing unit 1101 is configured to: obtain a quantity of the second PDSCH or the second PUSCH, or a proportion of the second PDSCH or the second PUSCH among the plurality of PDSCHs or PUSCHs; when the quantity of the second PDSCH or the second PUSCH is greater than or equal to a quantity threshold, or when the proportion of the second PDSCH or the second PUSCH among the plurality of PDSCHs or PUSCHs is greater than or equal to a proportion threshold, determine the transmission beam corresponding to the second PDSCH or the second PUSCH according to manner 1 or manner 2; and when the quantity of the second PDSCH or the second PUSCH is less than the quantity threshold, or when the proportion of the second PDSCH or the second PUSCH among the plurality of PDSCHs or PUSCHs is less than the proportion threshold, determine the transmission beam corresponding to the second PDSCH or the second PUSCH according to manner 3.

It should be noted that the explanation of the method performed on the terminal side in any one of the foregoing embodiments in FIG. 3 to FIG. 9 is also applicable to the apparatus 110 for beam determination in this embodiment, the implementation principles of which are similar, and details are not described here again.

Figures 12, 13:
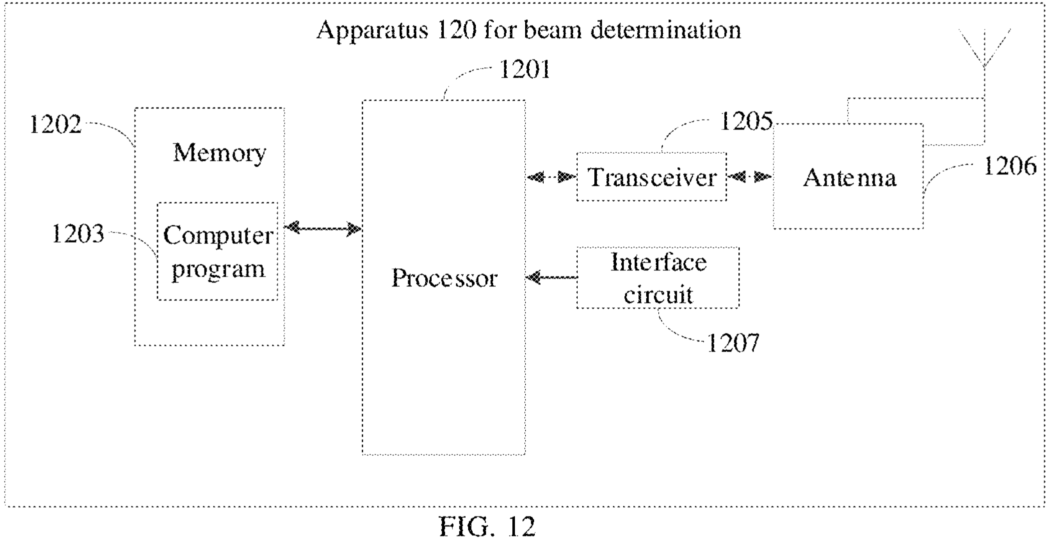
FIG. 12 is a schematic structural diagram of an apparatus for beam determination according to some embodiments of the present disclosure.
FIG. 13 is a schematic structural diagram of a chip according to some embodiments of the present disclosure.

FIG. 12 is a schematic structural diagram of another apparatus for beam determination according to some embodiments of the present disclosure. The apparatus 120 for beam determination may be a terminal, or may be a chip, a chip system, or a processor that supports a terminal to implement the foregoing method. The apparatus may be configured to implement the method described in the foregoing method embodiments, and details may be referred to the descriptions in the foregoing method embodiments.

The apparatus 120 for beam determination may include one or more processors 1201; and the processor 1201 may be a general-purpose processor, a dedicated processor, or the like. For example, it may be a baseband processor or a central processing unit. The baseband processor may be configured to perform processing on a communication protocol and communication data, and the central processing unit may be configured to control the apparatus for beam determination (such as a base station, a baseband chip, a terminal, a terminal chip, a DU, or a CU, etc.), and execute a computer program to process data of the computer program.

In some embodiments, the apparatus 120 for beam determination may further include one or more memories 1202, on which a computer program 1203 may be stored. The processor 1201 executes the computer program 1203, so that the apparatus 120 for beam determination performs the method described in the foregoing method embodiments. The computer program 1203 may be cured in the processor 1201; and in this case, the processor 1201 may be implemented by hardware.

In some embodiments, the memory 1202 may further store data. The apparatus 120 for beam determination and the memory 1202 may be separately provided, or may be integrated together.

In some embodiments, the apparatus 120 for beam determination may further include a transceiver 1205, and an antenna 1206. The transceiver 1205 may be referred to as a transceiving unit, a transceiving machine, or a transceiving circuit, and is configured to implement a transceiving function. The transceiver 1205 may include a receiver and a transmitter. The receiver may be referred to as a receiving machine or a receiving circuit, and is configured to implement a receiving function; and the transmitter may be referred to as a transmitting machine or a transmitting circuit, and is configured to implement a transmitting function.

In some embodiments, the apparatus 120 for beam determination may further include one or more interface circuits 1207, where the interface circuit 1207 is configured to receive a code instruction and transmit the code instruction to the processor 1201. The processor 1201 executes the code instruction, so that the apparatus 120 for beam determination performs the method described in the foregoing method embodiments.

The apparatus 120 for beam determination is a terminal, and the processor 1201 is configured to perform any method embodiment of the present disclosure.

It should be noted that the explanation of the method for beam determination in any one of the foregoing embodiments in FIG. 3 to FIG. 9 is also applicable to the apparatus 120 for beam determination in this embodiment, the implementation principle of which is similar, and details are not described here again.

In some embodiments, the processor 1201 may include a transceiver configured to implement a receiving and transmitting function. For example, the transceiver may be a transceiving circuit, an interface, or an interface circuit. The transceiving circuit, the interface, or the interface circuit configured to implement a receiving and transmitting function may be separate, or may be integrated together. The transceiving circuit, the interface, or the interface circuit may be configured to read and write code/data; or the transceiving circuit, the interface, or the interface circuit may be configured for signal transmission or delivery.

In some embodiments, the apparatus 120 for beam determination may include a circuit, and the circuit may implement a transmitting or receiving or communicating function in the foregoing method embodiments. The processor and the transceiver described in the present disclosure may be implemented on an integrated circuit (IC), an analog IC, a radio frequency integrated circuit (RFIC), a mixed signal IC, an application specific integrated circuit (ASIC), a printed circuit board (PCB), an electronic device, or the like. The processor and the transceiver may also be fabricated by using various IC process technologies, such as complementary metal oxide semiconductor (CMOS), nMetal-oxide-semiconductor (NMOS), positive channel metal oxide semiconductor (PMOS), bipolar junction transistor (BJT), bipolar CMOS (BiCMOS), silicon germanium (SiGe), gallium arsenide (GaAs), etc.

The apparatus for beam determination in the foregoing embodiments may be a terminal; however, the scope of the apparatus for beam determination described in the present disclosure is not limited to this, and the structure of the apparatus for beam determination may not be limited by FIG. 12. The apparatus for beam determination may be a independent device or may be part of a larger device. For example, the apparatus for beam determination may be:

(1) an independent integrated circuit (IC), or a chip, or a chip system or a subsystem;

(2) a set having one or more ICs; in some embodiments, the IC set may also include a storage component for storing data and a computer program;

(3) an ASIC, such as a modem;

(4) a module that may be embedded in other devices;

(5) a receiver, a terminal, an intelligent terminal, a cellular phone, a wireless device, a handset, a mobile unit, a vehicle-mounted device, a network device, a cloud device, an artificial intelligence device, or the like;

(6) Others, or the like.

In a case that the apparatus for beam determination is a chip or a chip system, reference may be made to the schematic structural diagram of a chip shown in FIG. 13. The chip shown in FIG. 13 includes a processor 1301 and an interface 1302, where there may be one or more processors 1301, and there may be a plurality of interfaces 1302.

For the case that the chip is configured to implement a function of the terminal in the embodiments of the present disclosure:

the interface 1302 is configured to receive a code instruction and transmit the code instruction to a processor;

the processor 1301 is configured to run the code instruction to perform the method according to FIG. 3 to FIG. 9.

In some embodiments, the chip further includes a memory 1303, and the memory 1303 is configured to store a necessary computer program and data.

It should be noted that the explanation of the method for beam determination in any one of the foregoing embodiments in FIG. 3 to FIG. 9 is also applicable to the chip in this embodiment, the implementation principle of which is similar, and details are not described here again.

Those skilled in the art may further understand that various illustrative logical blocks and steps listed in the embodiments of the present disclosure may be implemented by electronic hardware, computer software, or a combination of the them. Whether such function is implemented by hardware or software depends upon the particular application and design requirements of the overall system. Those skilled in the art may use functions implemented by various methods for each particular application, but it should not be understood that the implementation goes beyond the protection scope of the embodiments of the present disclosure.

According to some embodiments of the present disclosure, there is further provided a communication system. The system includes the apparatus for beam determination as a terminal in the foregoing embodiment in FIG. 12; or the system includes the apparatus for beam determination as a terminal in the foregoing embodiment in FIG. 13.

According to the present disclosure, there is further provided a readable storage medium with an instruction stored thereon. When the instruction is executed by a computer, the functions of any one of the foregoing method embodiments are implemented.

According to the present disclosure, there is further provided a computer program product. When the computer program product is executed by a computer, the functions of any one of the foregoing method embodiments are implemented.

All or some of the foregoing embodiments may be implemented by using software, hardware, firmware, or any combination of them. When software is used to implement the embodiments, all or some of the embodiments may be implemented in a form of a computer program product. The computer program product includes one or more computer programs. When the computer program is loaded and executed on a computer, the procedures or functions according to the embodiments of the present disclosure are all or partially generated. The computer may be a general-purpose computer, a dedicated computer, a computer network, or another programmable apparatus. The computer program may be stored in a computer-readable storage medium, or transmitted from a computer-readable storage medium to another computer-readable storage medium; for example, the computer program may be transmitted from a website, a computer, a server, or a data center to another website, another computer, another server, or another data center in a wired manner (such as, a coaxial cable, an optical fiber, a digital subscriber line (DSL)), or in a wireless manner (such as infrared, wireless, or microwave). The computer-readable storage medium may be any usable medium accessible by a computer, or a data storage device, such as a server or a data center including one or more usable medium. The usable medium may be a magnetic medium (such as a floppy disk, a hard disk, or a magnetic tape), an optical medium (such as a high-density digital video disk (DVD)), a semiconductor medium (such as a solid state disk (SSD)), or the like.

According to embodiments of a first aspect of the present disclosure, there is provided a method for beam determination; the method is performed by a terminal, and the method includes: determining, when a plurality of physical downlink shared channels (PDSCHs) or physical uplink shared channels (PUSCHs) is scheduled through a piece of downlink control information (DCI), transmission beams corresponding to the plurality of PDSCHs or PUSCHs, where the plurality of PDSCHs or PUSCHs are used to transmit different transmission blocks (TBs).

In this technical solution, when a plurality of PDSCHs or PUSCHs is scheduled through a piece of DCI, transmission beams corresponding to the plurality of PDSCHs or PUSCHs are determined, where different TBs are transmitted through the plurality of PDSCHs or PUSCHs. Therefore, the terminal can determine the receive beam corresponding to each PDSCH scheduled through the piece of DCI, or determine the transmit beam corresponding to each PUSCH scheduled through the piece of DCI, so as to communicate with a network device based on the determined beam.

In some embodiments, determining the transmission beams corresponding to the plurality of PDSCHs or PUSCHs includes: determining a first PDSCH or a first PUSCH among the plurality of PDSCHs or PUSCHs, where a scheduling offset of the first PDSCH or the first PUSCH is less than a time duration for quasi co-location (TimeDurationForQCL); and determining a default transmission beam corresponding to the first PDSCH or the first PUSCH.

In some embodiments, determining the default transmission beam corresponding to the first PDSCH or the first PUSCH includes: obtaining, when the DCI is single DCI in a single transmission reception point (TRP) scenario, a slot of a reference PDCCH before the first PDSCH or the first PUSCH; and obtaining a beam corresponding to a control resource set (CORESET) with a minimum CORESET ID detected in the slot of the reference PDCCH, as the default transmission beam corresponding to the first PDSCH or the first PUSCH.

In some embodiments, determining the default transmission beam corresponding to the first PDSCH or the first PUSCH includes: obtaining, when the DCI is multi-DCI in a multi-DCI based multi-TRP scenario, a slot of a reference PDCCH before the first PDSCH or the first PUSCH; and obtaining a beam corresponding to a CORESET with a minimum CORESET ID among a plurality of CORESETs with same control resource set pool index (CORESET PoolIndex) detected in the slot of the reference PDCCH, as the default transmission beam corresponding to the first PDSCH or the first PUSCH.

In some embodiments, determining the default transmission beam corresponding to the first PDSCH or the first PUSCH includes: determining, when the DCI is single DCI in a single DCI based multi-TRP scenario, whether the terminal is configured with an enable identification of EnableTwoDefaultTCIstates or not, where the enable identification is used to identify that the terminal is allowed to adopt two default TCI states; obtaining, if the terminal is configured with the EnableTwoDefaultTCIstates, a beam associated with a minimum codepoint including two TCI states among codepoints corresponding to a TCI domain, as the default transmission beam corresponding to the first PDSCH or the first PUSCH; and obtaining, if the terminal is not configured with the EnableTwoDefaultTCIstates, a beam corresponding to a CORESET with a minimum CORESET ID in the slot of the reference PDCCH, as the default transmission beam corresponding to the first PDSCH or the first PUSCH.

In some embodiments, the reference PDCCH is a PDCCH that needs to be detected recently before the first PDSCH or the first PUSCH.

In some embodiments, the method further includes: determining a second PDSCH or a second PUSCH among the plurality of PDSCHs or PUSCHs, where a scheduling offset of the second PDSCH or the second PUSCH is greater than or equal to a time duration for quasi co-location (TimeDurationForQCL); and determining a transmission beam corresponding to the second PDSCH or the second PUSCH.

In some embodiments, the transmission beam corresponding to the second PDSCH or the second PUSCH is determined according to any one of following manners:

manner 1: in a case that the DCI is provided with a transmission configuration indicator (TCI) domain, using a beam indicated by the TCI domain as the transmission beam corresponding to the second PDSCH or the second PUSCH;

manner 2: in a case that the DCI is not provided with the TCI domain, using a beam for scheduling a physical downlink control channel (PDCCH) of the second PDSCH or the second PUSCH as the transmission beam corresponding to the second PDSCH or the second PUSCH; and manner 3: in a case that the DCI is not provided with the TCI domain, determining a default transmission beam of the second PDSCH or the second PUSCH according to a same manner as for the first PDSCH or the first PUSCH.

In some embodiments, the method further includes: obtaining a quantity of the second PDSCH or the second PUSCH, or a proportion of the second PDSCH or the second PUSCH among the plurality of PDSCHs or PUSCHs; determining, when the quantity of the second PDSCH or the second PUSCH is greater than or equal to a quantity threshold, or when the proportion of the second PDSCH or the second PUSCH among the plurality of PDSCHs or PUSCHs is greater than or equal to a proportion threshold, the transmission beam corresponding to the second PDSCH or the second PUSCH according to the manner 1 or the manner 2; and determining, when the quantity of the second PDSCH or the second PUSCH is less than the quantity threshold, or when the proportion of the second PDSCH or the second PUSCH among the plurality of PDSCHs or PUSCHs is less than the proportion threshold, the transmission beam corresponding to the second PDSCH or the second PUSCH according to the manner 3.

According to embodiments of a second aspect of the present disclosure, there is provided an apparatus for beam determination. The apparatus for beam determination has some or all of functions of the terminal for implementing the method according to the first aspect. For example, the functions of the apparatus for beam determination may include functions in some or all of the embodiments of the present disclosure, or may include functions for separately implementing any one of the embodiments of the present disclosure. The functions may be implemented by hardware, or may be implemented by hardware executing corresponding software. The hardware or the software includes one or more units or modules corresponding to the foregoing functions.

According to embodiments of a third aspect of the present disclosure, there is provided an apparatus for beam determination, where the apparatus includes a processor; when the processor invokes a computer program in a memory, the method according to the first aspect is performed.

According to embodiments of a fourth aspect of the present disclosure, there is provided another apparatus for beam determination, where the apparatus includes a processor and a memory; the memory stores a computer program; and when the computer program is executed by the processor, the method according to the first aspect is performed.

According to embodiments of a fifth aspect of the present disclosure, there is provided another apparatus for beam determination, where the apparatus includes a processor and an interface circuit; the interface circuit is configured to receive a code instruction and transmit the code instruction to the processor; and the processor is configured to run the code instruction to enable the apparatus to perform the method according to the first aspect.

According to embodiments of a sixth aspect of the present disclosure, there is provided a communication system, where the system includes the apparatus for beam determination according to the second aspect, or the system includes the apparatus for beam determination according to the third aspect, or the system includes the apparatus for beam determination according to the fourth aspect, or the system includes the apparatus for beam determination according to the fifth aspect.

According to embodiments of a seventh aspect of the present disclosure, there is provided a computer-readable storage medium configured to store an instruction used by the terminal; when the instruction is executed, the terminal is enabled to perform the method according to the first aspect.

According to embodiments of an eighth aspect of the present disclosure, there is provided a computer program product including a computer program; when the computer program product runs on a computer, the computer is enabled to perform the method according to the first aspect.

According to embodiments of a ninth aspect of the present disclosure, there is provided a chip system, where the chip system includes at least one processor and an interface, and is configured to support a network device to implement functions involved in the first aspect, such as determining or processing at least one of data and information involved in the foregoing method. In a possible design, the chip system further includes a memory, and the memory is configured to store a computer program and data that are necessary for the network device. The chip system may include a chip, or may include a chip and another discrete component.

According to embodiments of a tenth aspect of the present disclosure, there is provided a computer program; when the computer program runs on a computer, the computer is enabled to perform the method according to the first aspect.

Those of ordinary skill in the art may understand that various numbers such as first and second involved in the present disclosure are merely for distinguishing for ease of description, and are not intended to limit the scope of the embodiments of the present disclosure, and also do not indicate a sequential order.

"At least one" in the present disclosure may also be described as one or more, and may be two, three, four, or more, which is not limited in the present disclosure. In the embodiments of the present disclosure, for a type of technical features, technical features in this type of technical features are distinguished by "first", "second", "third", "A", "B", "C", and "D", etc. The technical features described by "first", "second", "third", "A", "B", "C" and "D" have no sequential order or size order.

It may be understood that "a plurality" in the present disclosure refers to two or more, and the other quantifiers are similar to it. "And/or" is used to describe an associated relationship between associate objects, and indicates that there may be three kind of relationships; for example, "A and/or B" may indicate three situations that A exists alone, A and B exist simultaneously, and B exists alone. The character "/" generally indicates an "or" relationship between the associated objects before and after. The singular forms of "a", "the" and "said" are intended to include the plural forms as well, unless the context clearly indicates other meanings.

As used here, the word "if" may be interpreted as "at the time" or "when" or "in response to determining".

The corresponding relationship shown in the various tables in the present disclosure may be configured, or may be predefined. The value of the information in each table is merely an example, and may be configured as other values, which is not limited in the present disclosure. When the corresponding relationships between the information and the various parameters are configured, it is not necessary to configure all corresponding relationships shown in the tables. For example, in the tables in the present disclosure, the corresponding relationships shown in some rows may also not be configured. For another example, appropriate deformation adjustment, such as splitting, merging, or the like, may be performed based on the foregoing tables. Names of the parameters shown by the titles in the foregoing tables may also be other names that may be understood by the communication apparatus, and values or representations of the parameters may also be other values or representations that may be understood by the communication apparatus. When the foregoing tables are implemented, other data structures may be used; for example, an array, a queue, a container, a stack, a linear table, a pointer, a linked list, a tree, a graph, a structure, a class, a heap, or a hash table may be used. The predefining in the present disclosure may be understood as defining, pre-defining, storing, pre-storing, pre-negotiating, pre-configuration, curing, or pre-firing.

Those of ordinary skill in the art may be aware that, the units and algorithm steps of the various examples described in combination with the embodiments disclosed in the context, may be implemented by electronic hardware or a combination of computer software with electronic hardware. Whether the functions are performed by hardware or software depends on particular applications and design constraint conditions of the technical solutions. Those skilled in the art may use different methods to implement the described functions for each particular application, however, it should not be considered that the implementation goes beyond the scope of the present disclosure. It may be clearly understood by those skilled in the art that, for the purpose of convenient and brief description, for the detailed working process of the foregoing system, apparatus, and unit, reference may be made to the corresponding process in the foregoing method embodiments, and details are not described here again.

The above are only specific embodiments of the present disclosure; however, the protection scope of the present disclosure is not limited to this, and any person skilled in the art can easily conceive of change or replacement within the technical scope disclosed by the present disclosure, which should be covered within the protection scope of the present disclosure. Therefore, the protection scope of the present disclosure shall be subject to the protection scope of the claims.

What is claimed is:

1. A method for beam determination, performed by a terminal, and comprising:

determining transmission beams corresponding to a plurality of physical downlink shared channels (PDSCHs) or physical uplink shared channels (PUSCHs), wherein the plurality of PDSCHs or PUSCHs are scheduled through a piece of downlink control information (DCI) and configured to transmit different transmission blocks (TBs);

wherein determining the transmission beams corresponding to the plurality of PDSCHs or PUSCHs comprises:

determining a first PDSCH or a first PUSCH among the plurality of PDSCHs or PUSCHs, wherein a scheduling offset of the first PDSCH or the first PUSCH is less than a time duration for quasi co-location (TimeDurationForQCL); and determining a default transmission beam corresponding to the first PDSCH or the first PUSCH;

wherein determining the default transmission beam corresponding to the first PDSCH or the first PUSCH comprises:

determining whether the terminal is configured with an enable identification of EnableTwoDefaultTCIstates or not, wherein the DCI is single DCI in a single DCI based multi-TRP scenario, and the enable identification is configured to identify that the terminal is allowed to adopt two default transmission configuration indicator (TCI) states;

obtaining, in response to determining that the terminal is configured with the EnableTwoDefaultTCIstates, a beam associated with a minimum codepoint comprising two TCI states among codepoints corresponding to a TCI domain, as the default transmission beam corresponding to the first PDSCH or the first PUSCH; or obtaining, in response to determining that the terminal is not configured with the EnableTwoDefaultTCIstates, a beam corresponding to a control resource set (CORESET) with a minimum CORESET ID in a slot of a reference physical downlink control channel (PDCCH), as the default transmission beam corresponding to the first PDSCH or the first PUSCH.

2. The method according to claim 1, wherein determining the default transmission beam corresponding to the first PDSCH or the first PUSCH further comprises:

obtaining a slot of a reference PDCCH before the first PDSCH or the first PUSCH, wherein the DCI is single DCI in a single transmission reception point (TRP) scenario; and obtaining the beam corresponding to the CORESET with the minimum CORESET ID detected in the slot of the reference PDCCH, as the default transmission beam corresponding to the first PDSCH or the first PUSCH.

3. The method according to claim 2, wherein the reference PDCCH is a PDCCH that needs to be detected recently before the first PDSCH or the first PUSCH.

4. The method according to claim 1, wherein determining the default transmission beam corresponding to the first PDSCH or the first PUSCH further comprises:

obtaining a slot of a reference PDCCH before the first PDSCH or the first PUSCH, wherein the DCI is multi-DCI in a multi-DCI based the multi-TRP scenario; and obtaining a beam corresponding to a CORESET with a minimum CORESET ID among a plurality of CORESETs with same control resource set pool index (CORESET PoolIndex) detected in the slot of the reference PDCCH, as the default transmission beam corresponding to the first PDSCH or the first PUSCH.

5. The method according to claim 1, further comprising:

determining a second PDSCH or a second PUSCH among the plurality of PDSCHs or PUSCHs, wherein a scheduling offset of the second PDSCH or the second PUSCH is greater than or equal to the time duration for quasi co-location (TimeDurationForQCL); and determining a transmission beam corresponding to the second PDSCH or the second PUSCH.

6. The method according to claim 5, wherein the transmission beam corresponding to the second PDSCH or the second PUSCH is determined according to at least one of:

manner 1: in response to determining that the DCI is provided with a transmission configuration indicator (TCI) domain, using a beam indicated by the TCI domain as the transmission beam corresponding to the second PDSCH or the second PUSCH;

manner 2: in response to determining that the DCI is not provided with the TCI domain, using a beam for scheduling a physical downlink control channel (PDCCH) of the second PDSCH or the second PUSCH as the transmission beam corresponding to the second PDSCH or the second PUSCH; or manner 3: in response to determining that the DCI is not provided with the TCI domain, determining a default transmission beam of the second PDSCH or the second PUSCH according to a same manner as for the first PDSCH or the first PUSCH.

7. The method according to claim 6, further comprising:

obtaining a quantity of the second PDSCH or the second PUSCH, or a proportion of the second PDSCH or the second PUSCH among the plurality of PDSCHs or PUSCHs;

determining, in response to determining that the quantity of the second PDSCH or the second PUSCH is greater than or equal to a quantity threshold, or that the proportion of the second PDSCH or the second PUSCH among the plurality of PDSCHs or PUSCHs is greater than or equal to a proportion threshold, the transmission beam corresponding to the second PDSCH or the second PUSCH according to the manner 1 or the manner 2; and determining, in response to determining that the quantity of the second PDSCH or the second PUSCH is less than the quantity threshold, or that the proportion of the second PDSCH or the second PUSCH among the plurality of PDSCHs or PUSCHs is less than the proportion threshold, the transmission beam corresponding to the second PDSCH or the second PUSCH according to the manner 3.

8. The method according to claim 7, wherein the quantity threshold and the proportion threshold are preset.

9. The method according to claim 8, wherein the quantity threshold and the proportion threshold are predefined through a protocol.

10. The method according to claim 8, wherein the quantity threshold and the proportion threshold are configured by a network device and sent to the terminal.

11. A non-transitory computer-readable storage medium storing an instruction that, when executed by a processor, causes the processor to perform the method according to claim 1.

12. The method according to claim 1, wherein determining transmission beams corresponding to the plurality of PDSCHs or PUSCHs comprises:

determining a receive beam corresponding to a PDSCH in the plurality of PDSCHs, wherein the plurality of PDSCHs are scheduled through the piece of DCI.

13. The method according to claim 1, wherein determining transmission beams corresponding to the plurality PDSCHs or PUSCHs comprises:

determining a transmit beam corresponding to a PUSCH in the plurality of PUSCHs, wherein the plurality of PUSCHs are scheduled through the piece of DCI.

14. The method according to claim 1, wherein a quantity of the first PDSCH or the first PUSCH is at least one.

15. The method according to claim 1, wherein the default transmission beam comprises a default receive beam and a default transmit beam.

16. The method according to claim 1, wherein a corresponding relationship between the two TCI states corresponding to the minimum codepoint and the first PDSCH is the same as a corresponding relationship of a frequency division multiplexing scheme A (FDMSchemeA), a FDMSchemeB, a time division multiplexing scheme A (TDMSchemeA), or a TDMSchemeB in a current protocol.

17. A terminal, comprising:

a processor; and a memory storing a computer program executable by the processor, wherein the processor is configured to:

determine transmission beams corresponding to a plurality of physical downlink shared channels (PDSCHs) or physical uplink shared channels (PUSCHs), wherein the plurality of PDSCHs or PUSCHs are scheduled through a piece of downlink control information (DCI) and configured to transmit different transmission blocks (TBs);

wherein the processor is configured to:

determine a first PDSCH or a first PUSCH among the plurality of PDSCHs or PUSCHs, wherein a scheduling offset of the first PDSCH or the first PUSCH is less than a time duration for quasi co-location (TimeDurationForQCL); and determine a default transmission beam corresponding to the first PDSCH or the first PUSCH;

wherein the processor is specifically configured to:

determine whether the terminal is configured with an enable identification of EnableTwoDefaultTCIstates or not, wherein the DCI is single DCI in a single DCI based multi-TRP scenario, and the enable identification is configured to identify that the terminal is allowed to adopt two default transmission configuration indicator (TCI) states;

obtain, in response to determining that the terminal is configured with the EnableTwoDefaultTCIstates, a beam associated with a minimum codepoint comprising two TCI states among codepoints corresponding to a TCI domain, as the default transmission beam corresponding to the first PDSCH or the first PUSCH; or obtain, in response to determining that the terminal is not configured with the EnableTwoDefaultTCIstates, a beam corresponding to a control resource set (CORESET) with a minimum CORESET ID in a slot of a reference physical downlink control channel (PDCCH), as the default transmission beam corresponding to the first PDSCH or the first PUSCH.

18. A terminal, comprising:

a processor; and an interface circuit;

wherein the interface circuit is configured to receive a code instruction and transmit the code instruction to the processor; and the processor is configured to run the code instruction to:

determine transmission beams corresponding to a plurality of physical downlink shared channels (PDSCHs) or physical uplink shared channels (PUSCHs), wherein the plurality of PDSCHs or PUSCHs are scheduled through a piece of downlink control information (DCI) and configured to transmit different transmission blocks (TBs);

wherein the processor is configured to run the code instruction to:

determine a first PDSCH or a first PUSCH among the plurality of PDSCHs or PUSCHs, wherein a scheduling offset of the first PDSCH or the first PUSCH is less than a time duration for quasi co-location (TimeDurationForQCL); and determine a default transmission beam corresponding to the first PDSCH or the first PUSCH;

wherein the processor is specifically configured to run the code instruction to:

determine whether the terminal is configured with an enable identification of EnableTwoDefaultTCIstates or not, wherein the DCI is single DCI in a single DCI based multi-TRP scenario, and the enable identification is configured to identify that the terminal is allowed to adopt two default transmission configuration indicator (TCI) states;

obtain, in response to determining that the terminal is configured with the EnableTwoDefaultTCIstates, a beam associated with a minimum codepoint comprising two TCI states among codepoints corresponding to a TCI domain, as the default transmission beam corresponding to the first PDSCH or the first PUSCH; or obtain, in response to determining that the terminal is not configured with the EnableTwoDefaultTCIstates, a beam corresponding to a control resource set (CORESET) with a minimum CORESET ID in a slot of a reference physical downlink control channel (PDCCH), as the default transmission beam corresponding to the first PDSCH or the first PUSCH.

* * * * *